United States Patent Office 3,383,489
Patented May 14, 1968

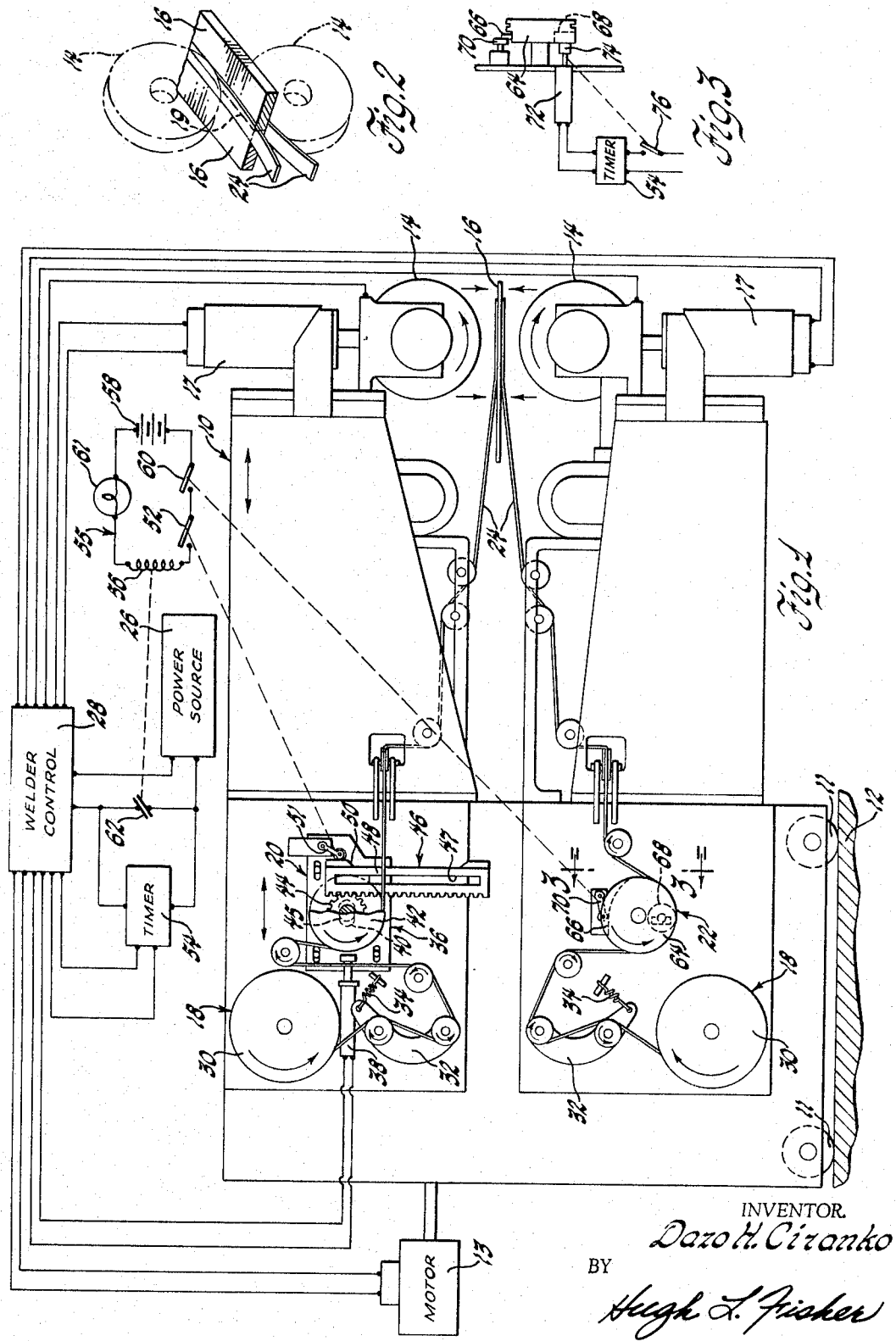

3,383,489
WELDING APPARATUS
Dazo H. Ciranko, Grand Rapids, Mich., assignor to General Motors Corporation, Detroit, Mich., a corporation of Delaware
Filed Oct. 10, 1963, Ser. No. 315,324
11 Claims. (Cl. 219—81)

ABSTRACT OF THE DISCLOSURE

Welding apparatus incorporating detector mechanism that is driven by welding filler material until a rupture occurs. Upon the occurrence of a rupture, the detector mechanism is no longer driven and causes a relay circuit to turn off the power after a timed interval expires.

---

This invention relates generally to welding apparatus, and more particularly to improvements in welding apparatus of the type used, although not exclusively, in butt welding.

The supply of filler material to the welding area, particularly if the material is thin shim foil, can present a breakage problem, which is especially undesirable when the welding apparatus operates automatically. If the filler material ruptures or the feed mechanism fails, it is not readily apparent because the welding operation itself is usually obscured. Therefore, the completed workpieces must be examined as they leave the apparatus. With quantity production, several parts may have to be scrapped before the rupture is detected.

For the foregoing reason the invention contemplates a unique provision for detecting the failure of the filler material to be properly fed to the welding area.

More specifically, the invention contemplates novel structure for detecting ruptures in the welding filler material and, when a rupture is detected, causing the welding operation to be stopped and/or causing a visual indication of the failure to be made.

The foregoing and other objects and advantages of the invention will be apparent from the following description and from the accompanying drawings, in which:

FIGURE 1 is a schematic diagram of welding apparatus incorporating the principles of the invention;

FIGURE 2 is a view of two workpieces in abutting relationship ready to be welded at their injunction; and FIGURE 3 is a view looking in the direction of arrows 3—3 of FIGURE 1 of one of the control wheels employed by the detecting system.

Referring now to the drawings in detail and particularly to FIGURE 1, the welding apparatus there displayed includes a frame 10, which is shiftably mounted by rollers 11 on a guide 12. The frame 10 is moved fore and aft in the direction of the arrows by a suitable feed motor 13. On this frame 10 are mounted two similar electrode wheels 14, one on each side of the workpieces 16. The electrode wheels 14 are slidably positioned on the frame 10 so that they can be maneuvered up and down by motors 17 of any known type. Also mounted on the frame 10 are two supply or feed mechanisms 18, one for each electrode wheel 14 and detector mechanisms 20 and 22. Each feeding mechanism 18 supplies welding filler material, in this instance shim foil 24, to its respective electrode wheel 14.

The workpieces 16 when installed between the electrode wheels 14 abut each other, as viewed in FIGURE 2, and form a junction at 19. The electrode wheels 14 press the shim foil 24 against this junction 19 with the alignment being such that the foil 24 overlaps the junction 19 and the same extent on each side.

Welding current is supplied to the electrode wheels 14 from an appropriate power source 26 via a welder or cycling control 28, which may be of any known type and which can be adapted to afford the cyclic operation hereinafter described in a way well understood by those versed in the art. Hence, at the proper time, as determined by the welder control 28, the frame 10 is moved leftwardly from the position observed in FIGURE 1 by the feed motor 13 such that the shim foil 24, both on the top and the bottom of the junction 19 between the workpieces 16, is drawn towards the welding area and when melted by the welding current flows into the joint and makes a complete weld in the usual way.

Only that part of the welding apparatus considered necessary to understanding the invention has been discussed here. If additional information is wanted, reference can be made to the patent Busse et al. 2,812,417.

Considering now the feed mechanisms 18, each includes a rotatable spool 30 on which the shim foil 24 is wound. The foil 24 is directed to the welding area by a series of conveniently arranged pulleys. The number of pulleys and their disposition, of course, will vary with the requirements of the welding apparatus. The feeding mechanisms 18 also each include a tension bar 32 which is pivotally mounted on the frame 10, and a spring 34 which biases the tension bar 32 in a direction that maintains the shim foil 24 between the spool 30 and the detector mechanisms 20 and 22 with the proper tension.

The detector mechanisms 20 and 22 both serve the same purpose, and that is, they detect any ruptures in the shim foil 24 or any other related type of failures of the feed mechanisms 18. When such a failure is detected, the welding operation is interrupted and/or a visual indication of such is provided, as will be explained.

Describing first the detector mechanism 20, it comprises a mounting plate 36 which is shiftably mounted on the support 10 for movement in the direction of the arrows. Movement of the mounting plate 36 is generated by a detector motor 38 of any well known kind. The mounting plate 36 includes an elongated opening 40 that permits a control wheel 42 and a pinion gear 44 to be revolvably mounted on the frame 10 without interfering with the shifting movements of the plate 36. The control wheel 42 and the pinion gear 44 are drive connected through a shaft 45 which extends through the elongated opening 40. The pinion gear 44 engages a rack 46 having a lengthwise slot 47 in which is received a boss 48 on the mounting plate 36. Consequently, when the pinion gear 44 is revolved counterclockwise, the rack 46 will move upwardly on the mounting plate 36. Subsequently, when the mounting plate 36 is shifted rightwardly, the pinion gear 44 and the rack 46 disengage. This permits the rack 46, because of its own weight and the resultant gravity effect, to return to the illustrated position.

The rack 46 includes at its upper end a cam surface 50, the function of which is to actuate a switch arm 51 when the rack 46 is moved a certain initial distance upwardly. The arm 51 in turn closes a switch 52, also constituting a part of detector mechanism 20 as does a timer 54.

The functions of the switch 52 and the timer 54 can best be demonstrated by describing one welding cycle. The welding cycle is determined, as mentioned, by the program of the welder control 28. In this instance, the welder control 28 will initially energize the timer 54, which is conventional and which when energized completes the circuit between the power source 26 and the welder control 28. Assuming the electrode wheels 14 are in the proper welding position, welding current now will be supplied to the wheels 14 and the feed motor 13 can be energized to shift the frame 10 to the left and start the wheels 14 rolling so that the shim foil 24 is unwound from the spool 30. The unwinding shim foil 24 will revolve the control wheel 42 and accordingly the pinion gear 44, assuming also that the pinion gear 44 and the rack 46 are engaged, then the rack 46 will be driven upwardly.

During its upward travel of the rack 46, as has been explained, the cam surface 50 will actuate the arm 51 and close the switch 52. The switch 52 is a part of a relay circuit 55 including a relay 56, a voltage source 58, a switch 60, and indicator lamp 61. It is assumed at this time that the switch 60 is closed in a manner to be described in the explanation of the detector mechanism 22. Hence, the relay 56 will be energized and close normally open relay contacts 62 arranged in parallel with the timer 54 and between the power source 26 and the welder control 28. Subsequently, when the timer 54 times out and opens its branch of the circuit, the now closed contacts 62 will maintain connection between the power source 26 and the welder control 28. As a result, the welding operation will continue. At the completion of the welding operation the welder control 28 will cause the welding current to be cut off, the timer 54 to be reset, and the detector motor 38 energized so that the mounting plate 36 is shifted rightwardly to permit the rack 46 to return to its starting position. After the rack 46 is in this position, the plate 36 will be returned to the illustrated position.

With the relay circuit 55 completed the lamp 61 will be lighted. This indicates to the operator that the shim foil 24 is being fed to the welding area properly. In fact, if wanted, the lamp 61 could be relied upon entirely for indicating a mulfunction and the apparatus stopped manually.

If during the first described cycle a break in the shim foil 24 occurs or has just occurred in the previous cycle, the welding operation will still commence when the timer 54 starts. But because of the rupture of the shim foil 24, the control wheel 42 will not be revolved and, hence, the rack 46 will not travel the required distance to close the switch 52. Therefore, after the timer 54 times out and opens its branch of the circuit between the source 26 and the welder control 28, the contacts 62 will remain open since the relay 56 will not have been energized, and the circuit between the power source 26 and the welder control 28 will be interrupted stopping welding operation. The operator can check the source of trouble, correct it and, at most, only one set of workpieces 16 will be affected by the malfunction.

The detector mechanism 22 is a modification of the detector mechanism 20 and includes a control wheel 64 revolvably mounted on the frame 10 in the same way as the control wheel 36 for the detector mechanism 20. The control wheel 64 has on one side a cam surface 66 and on the opposite side an opening 68 (see FIGURE 3). The cam surface 66 engages a switch arm 70 for actuating the previously mentioned switch 60 in the relay circuit 55. The control wheel 64 makes one revolution for each welding operation and will, after a predetermined angular travel, actuate through the agency of the cam surface 66, the arm 70 at approximately the same time that the cam surface 50 on the rack 46 engages the switch 52. The switches 52 and 60 do not have to close simultaneously but they do have to close before the timer 54 times out if there are no malfunctions. Of course, if there is a failure of the feed mechanism 18 or the shim foil 24 is ruptured, the control wheel 64 will not revolve and the switch 60 will remain open, resulting in the stopping of the welding operation as described with respect to the detector mechanism 20.

To insure that the control wheel 64 always starts from the same point, a small motor 72 is utilized to move a stop plunger 74 into and out of the opening 68 in the control wheel 64. The disposition of the opening 68 necessarily coincides with the beginning of a welding cycle. Arrangements can be made such that unless the stop 74 is in the opening 68, a new welding cycle cannot be started, and then if properly located the timer 54 can be utilized to energize the motor 72 and cause the stop 74 to be withdrawn from the opening 68. One such way would be to have the plunger 74 actuate a switch 76 when in the opening 68 so as to permit the timer 54 to be reset and start timing. The plunger 74 would remain in the opening 68 until the timer 54 timed out. Then the timer 54 would cause the motor 72 to be energized and the plunger 74 withdrawn. Of course, the opening 68 would have to be elongated to permit this initial required travel of the control wheel 64.

As can now be appreciated, any time that the feed of the shim foil 24 through either of the detector mechanisms 20 or 22 fails due to a rupture or for some other reason, the entire welding operation is stopped. This occurs when the relay 56 is not energized after the timer 54 has timed out. This sequence of events interrupts the supply of power from the source 26. Moreover, the detector mechanisms 20 and 22 are particularly suited for convenient integration into any automatic welder controls negating the need for a manual operation. On the other hand, the indicating lamp 61 can be relied upon if manual operation is preferred, i.e., manually stopping the welding operation.

It should be kept in mind that although two different detector mechanisms 20 and 22 have been shown in use with one welding apparatus, two of either type can be employed together as determined by the usual factors, e.g., cost, application, etc.

The invention is to be limited only the following claims.
What is claimed is:

1. In welding apparatus incorporating a welder control for beginning and ending each welding operation, the combination of means feeding welding filler material to the welding area and means detecting a rupture of the filler material, the detecting means including means sensing feeding movements of the filler material, timing means operated by the welder control so as to start and continue a welding operation for a certain time interval and thereafter stop the welding operation, and switch means controlled by the sensing means, the switch means being operative when the filler material is being fed properly to the welding area to cause the welding operation to continue after the certain time interval until ended by the welder control and when the filler material is ruptured to permit the timing means to stop the welding operation.

2. In welding apparatus incorporating a welder control for beginning and ending each welding operation, the combination of a source of welding power for the apparatus, means feeding welding filler material to the welding area, and means detecting a failure of the filler material to be fed to the welding area, the detecting means including means sensing feeding movements of the filled material, timing means operated by the welder control to connect the source to the apparatus for a certain time interval so as to commence a welding operation and after the certain time interval operative to disconnect the source from the apparatus so as to stop the welding operation, and switch means also operative to connect the source to the apparatus, the switch means being controlled by the sensing means so that when the filler material is fed properly to the welding area the switch means will connect the source to the apparatus and thereby continue the welding operation after the certain time interval until ended by the welder control and when the filler material is not being properly fed to the welding area the switch means will not connect the source to the apparatus thereby permitting the timing means after the certain time interval to stop the welding operation.

3. In welding apparatus incorporating a welder control for beginning and ending each welding operation, the combination of a source of welding power, means feeding shim foil to the welding area, and means detecting a failure of the shim foil to be fed properly to the welding area, the detecting means including means sensing movements of the shim foil and comprising a control member drive-connected to the shim foil so as to have corresponding movements, timing means operated by the welder control to connect the source to the apparatus for a certain time interval so as to commence a welding operation and after the certain time interval operative to disconnnect the source from the apparatus so as to stop the welding operation, and switch means also operative to connect the source to the apparatus, the switch means being responsive to movements of the control member so that when the shim foil is being fed properly to the welding area to connect the source to the apparatus and thereby continue the welding operation after the certain time interval until ended by the welder control and when the shim stock is ruptured or otherwise is not being fed properly to the welding area to permit the timing means after the certain time interval to stop the welding operation.

4. In welding apparatus, the combination of means feeding welding filler material to the welding area, and means detecting a failure of the filler material to be fed properly to the welding area, the detecting means including a pinion gear, control means drive-connected to the filler material and operative to revolve the pinion gear when the filler material is being supplied to the welding area, a rack having starting and stopping positions coinciding with the beginning and ending of a welding operation, means engaging the rack and pinion at the beginning of a welding operation and disengaging the rack and pinion at the end of a welding operation, the rack being so arranged as to be returned to the starting position by gravity at the end of a welding cycle, and means controlled by the rack and so arranged as to be operative if the rack does not move from the starting to the ending position during a welding operation to indicate that the filler material is not being properly fed to the welding area.

5. In welding apparatus for welding workpieces together and incorporating a welder control for beginning and ending each welding operation, the combination of the source of welding power, means feeding shim foil to the welding area, and means detecting a failure of the shim foil to be properly fed to the welding area, the detecting means including means sensing movements of the shim foil comprising a control wheel revolvable by the shim foil, a pinion revolvable by the control wheel and a rack having starting and stopping positions coinciding respectively with the beginning and ending of a welding operation, and means engaging the rack and pinion at the beginning of a welding cycle and disengaging the rack and pinion at the end of a welding operation, the rack being so arranged as to be returned to the starting position by gravity at the end of a welding cycle, timing means operated by the welder control to connect the source to the apparatus for a certain time interval so as to commence a welding operation and after the certain time interval operative to disconnect the source from the apparatus so as to stop the welding operation, and switch means also operative to connect the source to the apparatus and controlled by the rack, the switch means being operative when the rack is moved a predetermined distance from the starting position to connect the source to the apparatus and thereby continue the welding operation after the certain time interval has elapsed until ended by the welded control, and when the shim foil ruptures or is otherwise improperly being fed to the welding area to permit the timing means after the certain time interval to stop the welding operation.

6. In welding apparatus, the combination of means feeding shim foil to the welding area, and means detecting a failure of the shim foil to be properly fed to the welding area, the detecting means including means sensing movements of the shim foil and comprising a control member drive-connected to the shim foil so as to have corresponding movements and including a cam surface thereon, and means controlled by the cam surface and so arranged as to be operative when the control member does not move a predetermined distance during a welding operation to indicate that the shim foil is ruptured or otherwise is not being fed properly to the welding area.

7. In welding apparatus incorporating a welder control for beginning and ending each welding operation, the combination of a source of welding power, means feeding shim foil to the welding area, and means detecting a failure of the shim foil to be properly fed to the welding area, the detecting means including means sensing movements of the shim foil and comprising a control wheel revolvable by the shim foil and having a cam surface thereon, timing means operated by the welder control to connect the source to the apparatus for a certain time interval so as to commence a welding operation and after the certain time interval operative to disconnect the source from the apparatus so as to stop the welding operation, and switch means also operative to connect the source to the apparatus, the switch means being so arranged as to be operated by the cam surface so that when the shim foil is being fed properly to the welding area to connect the source to the apparatus and thereby continue the welding operation after the certain time interval until ended by the welder control and when the shim stock is ruptured or otherwise is not being fed properly to the welding area to permit the timing means after the certain time interval to stop the welding operation.

8. In a device for detecting failures in tape-like material to be properly fed to apparatus incorporating a cycling control for beginning and ending each operation by the apparatus, the combination comprising means sensing feeding movements of the material, timing means rendered operative by the cycling control so as to commence operation by the apparatus and to continue the operation by the apparatus for a certain time interval and thereafter stop the operation, means controlled by the sensing means and operative when the material is being properly fed to the apparatus to cause the operation to be continued after the certain time interval until ended by the cycling control and when the material is being improperly fed to the apparatus to permit the timing means after the certain time interval to stop the operation.

9. In a device for detecting ruptures in tape-like material which is being fed to the apparatus incorporating a cycling control for beginning and ending each operation by the apparatus, the combination comprising means sensing feeding movements of the material, the sensing means including a control member drive-connected to the material so as to have corresponding movements, timing means rendered operative by the cycling control to start and continue operation by the apparatus for a certain time interval after which operation is stopped, and means operated by the control member when the material is being fed properly to cause the operation to be continued after the certain time interval until ended by the cycling control and when the material ruptures operative to permit the timing means to stop the operation.

10. In a device for detecting ruptures in tape-like material which is being fed to apparatus incorporating a cycling control for beginning and ending operation of the apparatus, the combination comprising means sensing feeding movements of the material, the sensing means including a pinion control means drive-connected to the material and operative to revolve the pinion as the material is fed to the apparatus, a rack having starting and stopping positions coinciding respectively with the beginning and ending of an operation by the apparatus, means engaging the rack pinion at the beginning of an operation and disengaging the rack and pinion at the ending of an operation, the rack being so arranged at the ending of an opertaion and after being disengaged from the pinion to return to the starting position due to gravity effect thereon, timing means operated by the cycling control to start and continue operation by the apparatus for a certain time interval and thereafter stop operation by the apparatus, means controlled by the rack and operative when the rack has moved a predetermined distance from the starting position for causing the apparatus to continue the operation after the certain time interval until ended by the cycling control thereby indicating that the material is being properly fed to the apparatus and when the material is improperly being fed to the apparatus to permit the timing means after the certain time interval to stop the welding operation.

11. In a device for detecting failures in tape-like material to be properly fed to apparatus incorporating a cycling for beginning and ending operation of the apparatus, the combination comprising means sensing feeding movements of the material, the sensing means including a control member driven by the material and having a cam surface thereon, timing means operated by the cycling control to start and continue operation by the apparatus for a certain time interval and thereafter stop operation by the apparatus, means controlled by the cam surface and operative when the control member moves a predetermined distance during an operation of the apparatus to continue its operation after the certain time interval until ended by the cycling control and when the control member does not move the predetermined distance during an operation to permit the timing means to stop operation by the apparatus.

References Cited

UNITED STATES PATENTS

| | | | |
|---|---|---|---|
| 2,101,382 | 12/1937 | Donoval et al. | 72—4 |
| 2,084,810 | 6/1937 | Jones | 226—11 |
| 2,653,536 | 9/1953 | Cooksey | 226—11 |
| 2,895,378 | 7/1959 | Budde | 200—60 |
| 2,896,944 | 7/1959 | Shiba | 226—11 |
| 2,912,563 | 11/1959 | Schlieker et al. | |
| 2,966,291 | 12/1960 | Anderson | 226—11 |
| 3,151,819 | 10/1964 | Hodgdon | 226—11 |
| 3,182,147 | 5/1965 | Larson | 340—259 |

FOREIGN PATENTS

| | | |
|---|---|---|
| 162,293 | 2/1958 | Sweden. |
| 349,804 | 3/1922 | Germany. |

RICHARD M. WOOD, *Primary Examiner.*

B. A. STEIN, *Assistant Examiner.*